(12) United States Patent
Watanabe et al.

(10) Patent No.: US 12,038,450 B2
(45) Date of Patent: Jul. 16, 2024

(54) AUTOMATIC ANALYSIS DEVICE

(71) Applicant: Hitachi High-Tech Corporation, Tokyo (JP)

(72) Inventors: Hiroshi Watanabe, Tokyo (JP); Kazuma Tamura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 265 days.

(21) Appl. No.: 17/772,381

(22) PCT Filed: Nov. 24, 2020

(86) PCT No.: PCT/JP2020/043548
§ 371 (c)(1),
(2) Date: Apr. 27, 2022

(87) PCT Pub. No.: WO2021/111916
PCT Pub. Date: Jun. 10, 2021

(65) Prior Publication Data
US 2022/0373570 A1  Nov. 24, 2022

(30) Foreign Application Priority Data
Dec. 5, 2019  (JP) .................................. 2019-220170

(51) Int. Cl.
*G01N 35/00*  (2006.01)

(52) U.S. Cl.
CPC .................. *G01N 35/00732* (2013.01); *G01N 2035/00772* (2013.01)

(58) Field of Classification Search
CPC .............. G01N 35/00732; G01N 2035/00772
See application file for complete search history.

(56) References Cited

U.S. PATENT DOCUMENTS

2011/0215149 A1  9/2011  Ohmae
2018/0290143 A1  10/2018  Cofano et al.

FOREIGN PATENT DOCUMENTS

| EP | 2 887 071 A1 | 6/2015 | |
| EP | 2887071 A1 * | 6/2015 | ............. B65G 65/00 |
| EP | 3 913 374 A1 | 11/2021 | |
| EP | 3913374 A1 * | 11/2021 | ............. B01L 3/508 |
| JP | 2-290558 A | 11/1990 | |

(Continued)

OTHER PUBLICATIONS

Extended European Search Report issued in European Application No. 20895070.9 dated Nov. 15, 2023 (9 pages).

(Continued)

*Primary Examiner* — Jamel E Williams
(74) *Attorney, Agent, or Firm* — Crowell & Moring LLP

(57) ABSTRACT

Provided is an automatic analysis device in which even an operator can easily identify the type of processing and the type of individual and erroneous setting hardly occurs. A vessel holder for holding a sample vessel, a reading unit for reading an identification area formed in the vessel holder, and a control unit for performing processing based on information read by the reading unit are included, in which the control unit identifies the type of processing based on the type of color applied to the identification area, and identifies the type of individual in the sample vessel based on how the identification area is colored.

2 Claims, 10 Drawing Sheets

(56) References Cited

FOREIGN PATENT DOCUMENTS

| | | | |
|---|---|---|---|
| JP | 6-148202 A | 5/1994 | |
| JP | 2682133 B2 | 11/1997 | |
| JP | 2008-32652 A | 2/2008 | |
| JP | 2008032652 A * | 2/2008 | |
| JP | 2010-217039 A | 9/2010 | |
| JP | 2011-185628 A | 9/2011 | |
| JP | 2011185628 A * | 9/2011 | ....... G01N 35/00732 |
| JP | 2017-26480 A | 2/2017 | |
| JP | 2017026480 A * | 2/2017 | |
| JP | 2018-189633 A | 11/2018 | |
| JP | 2018189633 A * | 11/2018 | ............... B01L 9/00 |
| WO | WO 2010/090138 A1 | 8/2010 | |

OTHER PUBLICATIONS

International Search Report (PCT/ISA/210) issued in PCT Application No. PCT/JP2020/043548 dated Feb. 9, 2021 with English translation (six (6) pages).

Japanese-language Written Opinion (PCT/ISA/237) issued in PCT Application No. PCT/JP2020/043548 dated Feb. 9, 2021 (four (4) pages).

Japanese-language International Preliminary Report on Patentability (PCT/IPEA/409) issued in PCT Application No. PCT/JP2020/043548 dated Jan. 21, 2022, including Annexes with partial English translation (17 pages).

* cited by examiner

[FIG. 1]
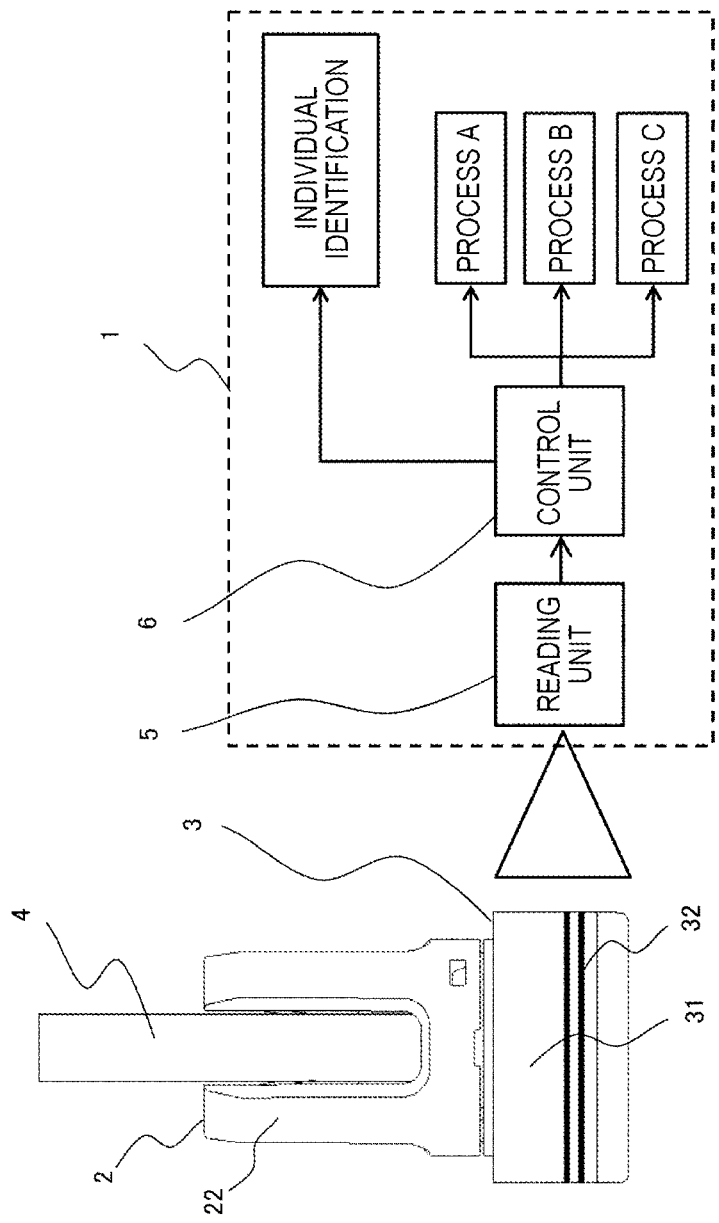

[FIG. 2]
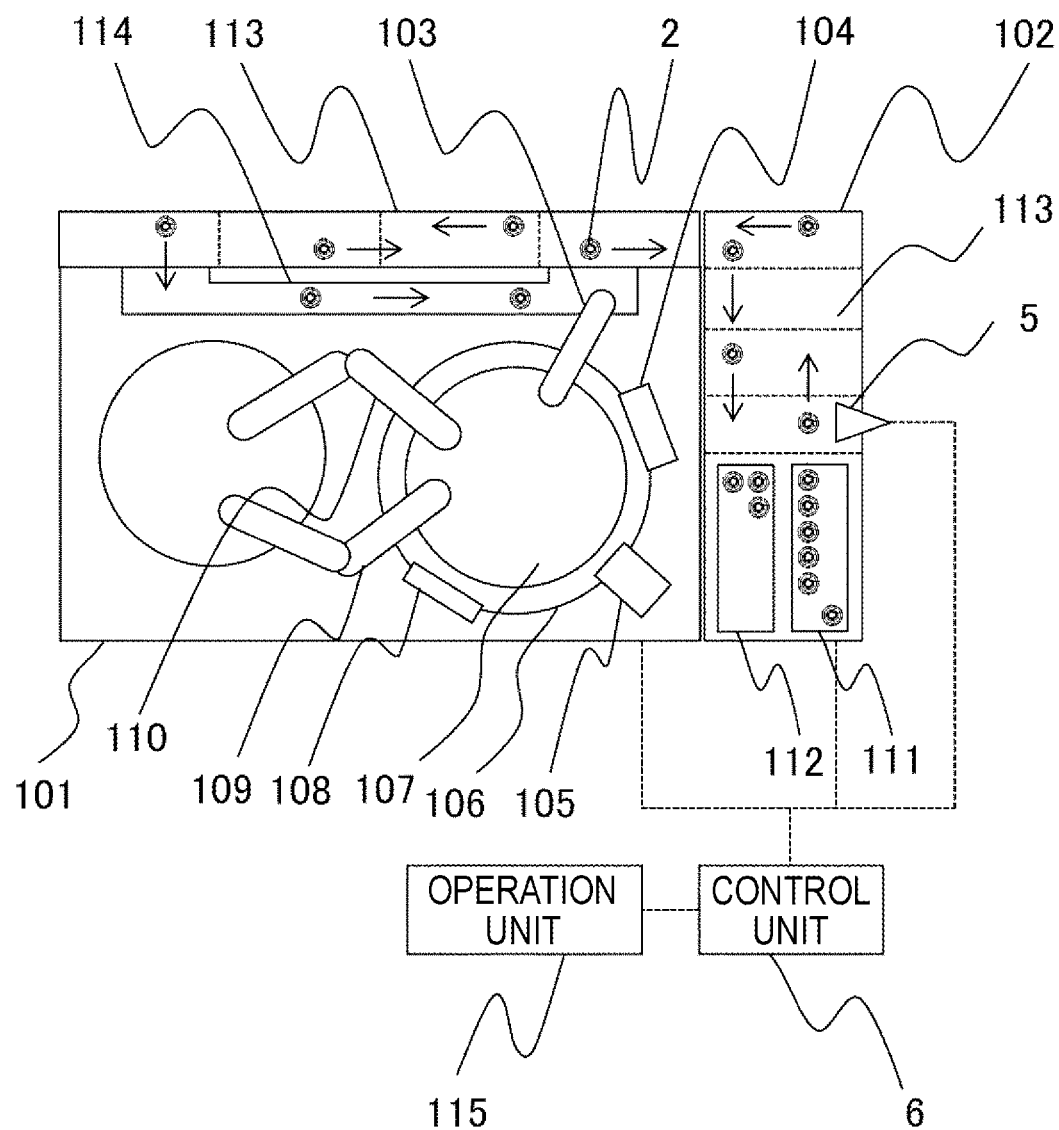

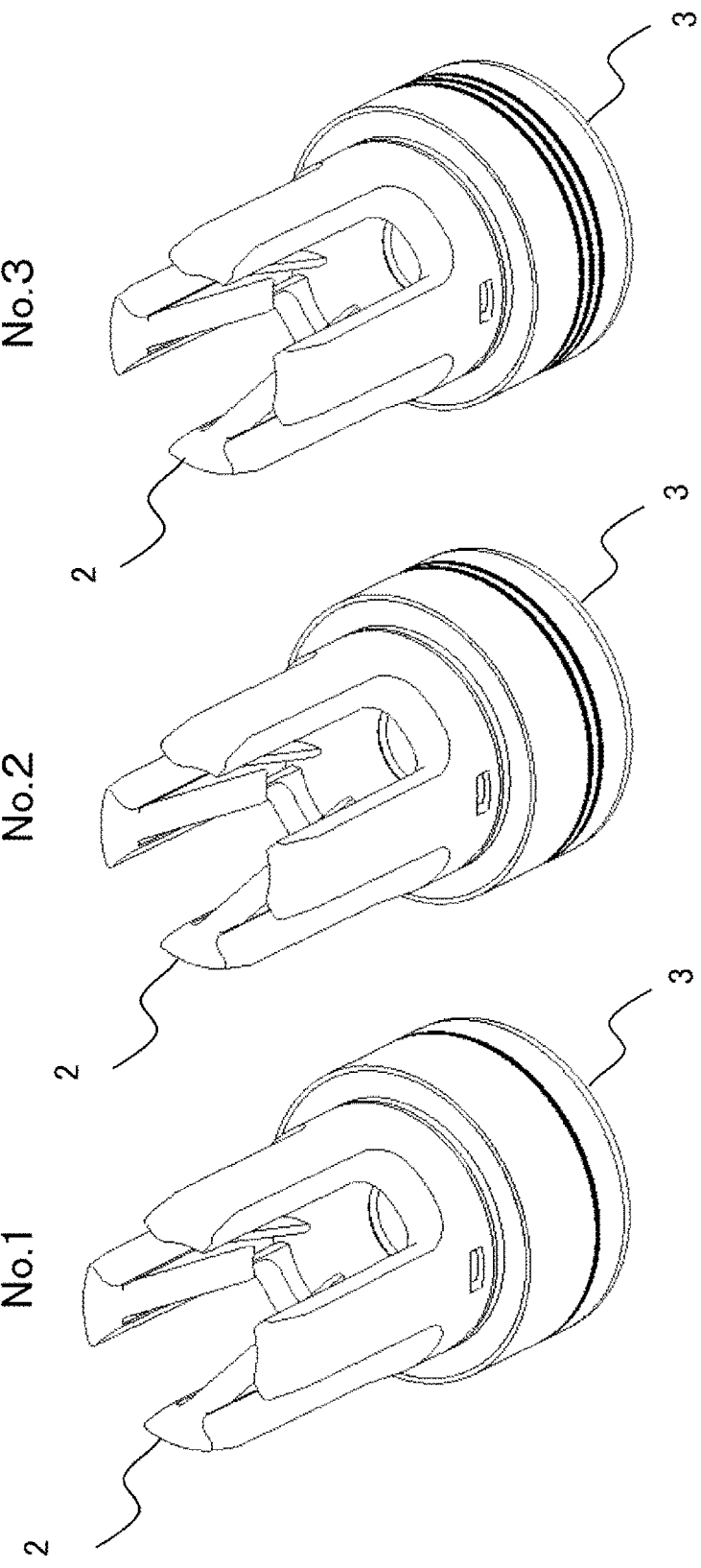
[FIG. 3]

[FIG. 4]
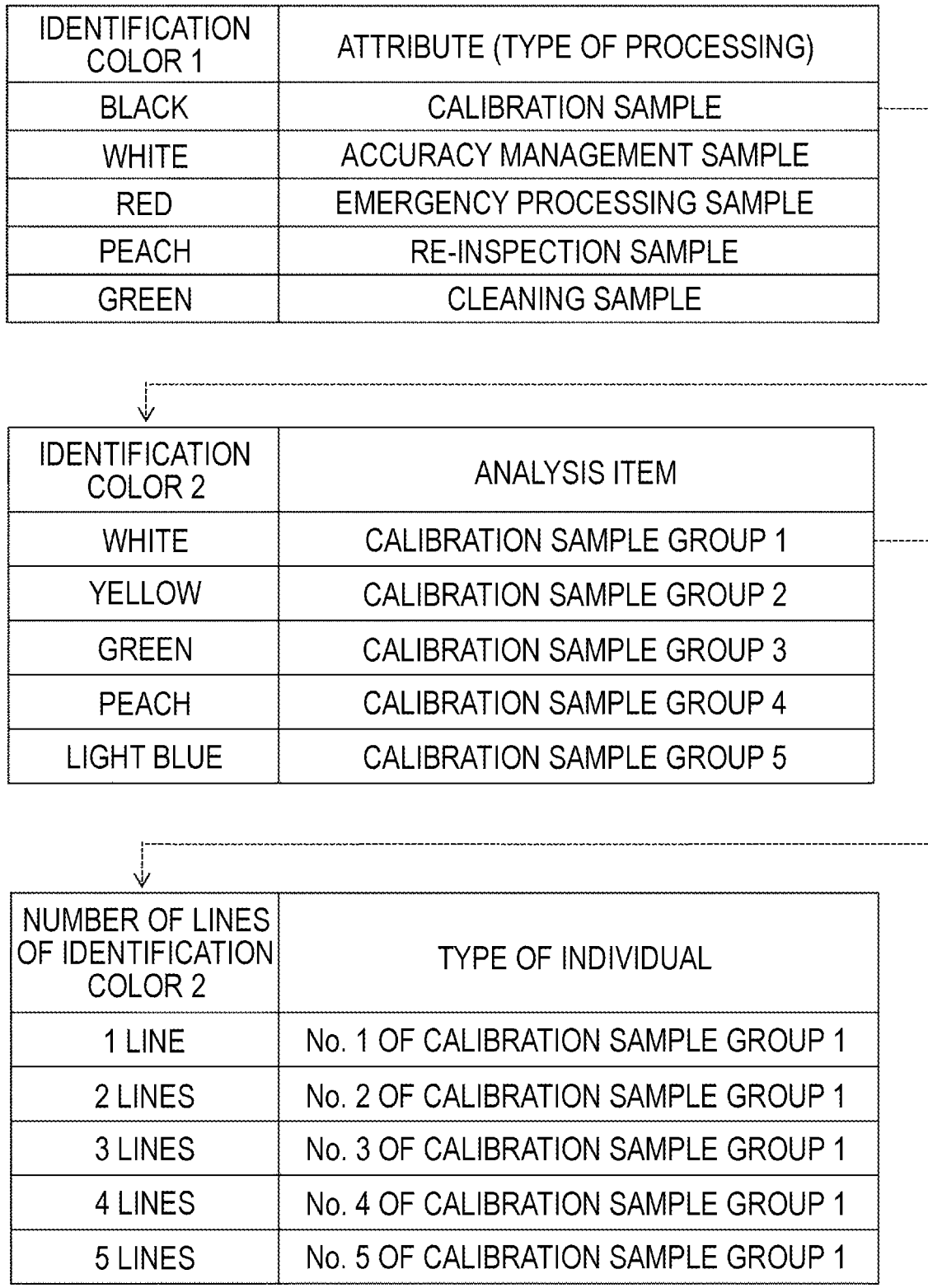

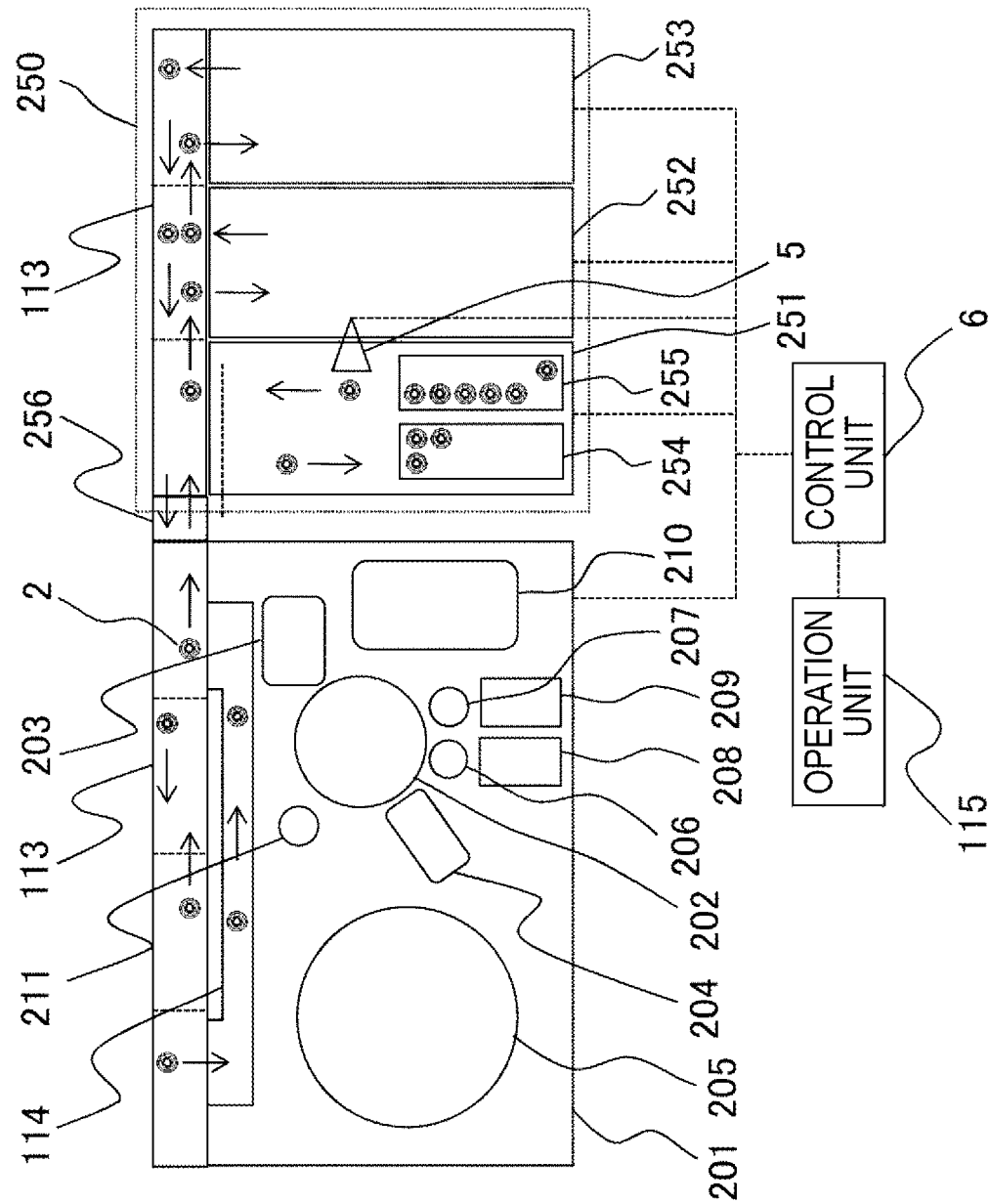
[FIG. 5]

[FIG. 6]
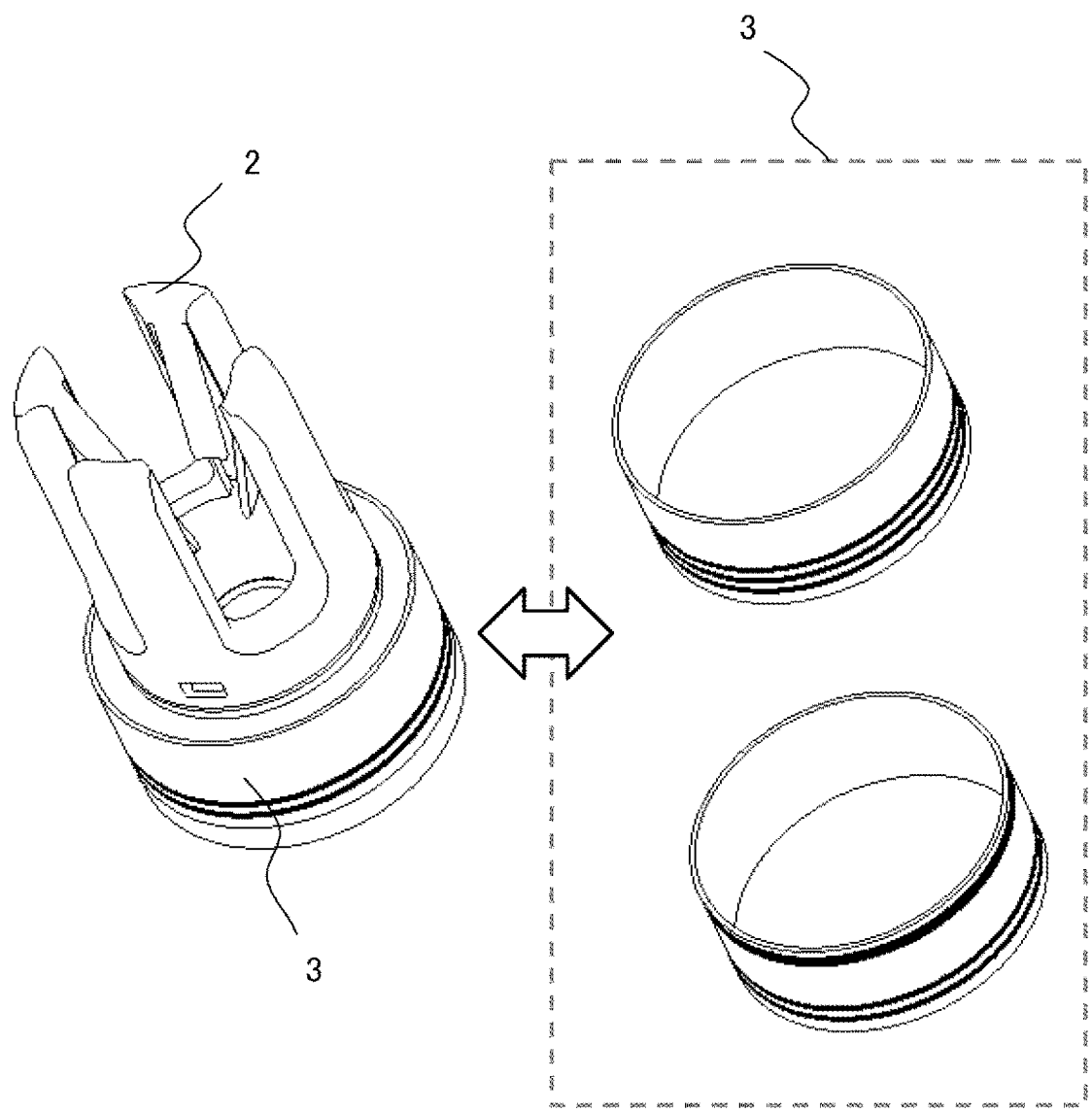

[FIG. 7]

| IDENTIFICATION COLOR 1 | ATTRIBUTE (TYPE OF PROCESSING) |
|---|---|
| BLACK | CALIBRATION SAMPLE |
| ⋮ | ⋮ |
| GREEN | CLEANING SAMPLE |

| IDENTIFICATION COLOR 2 | ANALYSIS ITEM |
|---|---|
| WHITE | CALIBRATION SAMPLE GROUP 1 |
| ⋮ | ⋮ |
| LIGHT BLUE | CALIBRATION SAMPLE GROUP 5 |

| NUMBER OF LINES OF IDENTIFICATION COLOR 2 | | TYPE OF INDIVIDUAL |
|---|---|---|
| THIN LINE | THICK LINE | |
| 1 LINE | NO | No. 1 OF CALIBRATION SAMPLE GROUP 5 |
| 2 LINES | NO | No. 2 OF CALIBRATION SAMPLE GROUP 5 |
| 3 LINES | NO | No. 3 OF CALIBRATION SAMPLE GROUP 5 |
| 4 LINES | NO | No. 4 OF CALIBRATION SAMPLE GROUP 5 |
| 5 LINES | NO | No. 5 OF CALIBRATION SAMPLE GROUP 5 |
| 1 LINE | YES | No. 6 OF CALIBRATION SAMPLE GROUP 5 |
| 2 LINES | YES | No. 7 OF CALIBRATION SAMPLE GROUP 5 |
| 3 LINES | YES | No. 8 OF CALIBRATION SAMPLE GROUP 5 |
| 4 LINES | YES | No. 9 OF CALIBRATION SAMPLE GROUP 5 |
| 5 LINES | YES | No. 10 OF CALIBRATION SAMPLE GROUP 5 |

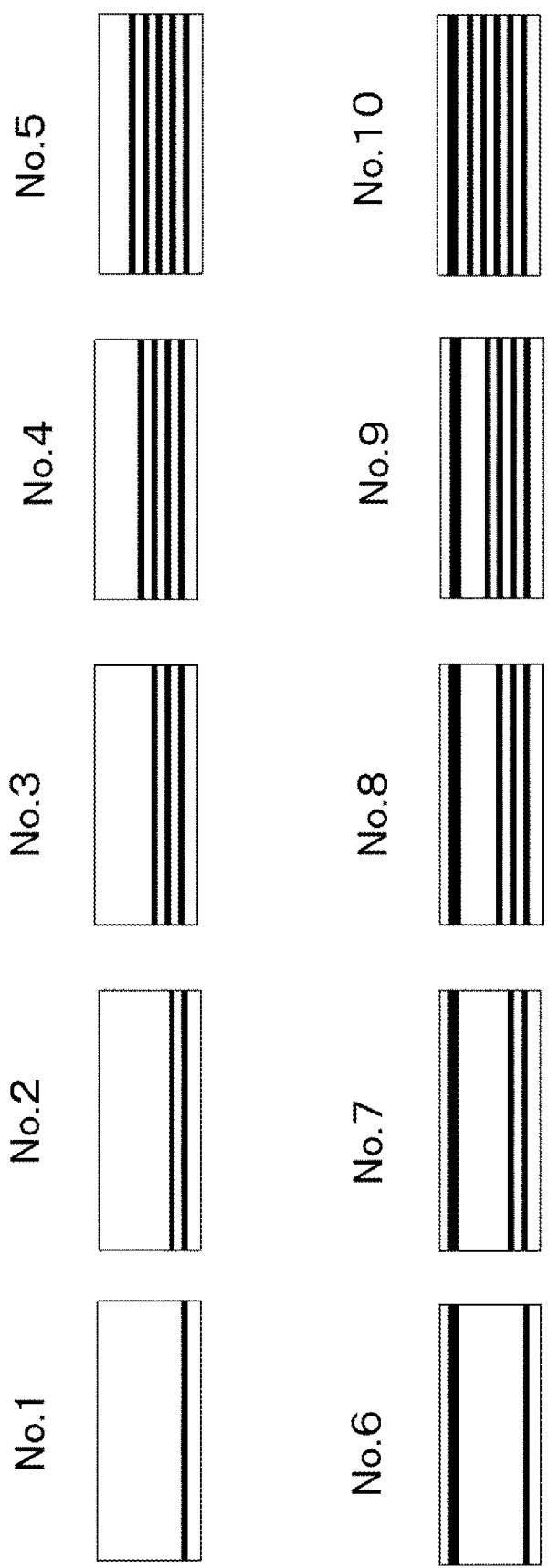
[FIG. 8]

[FIG. 9]
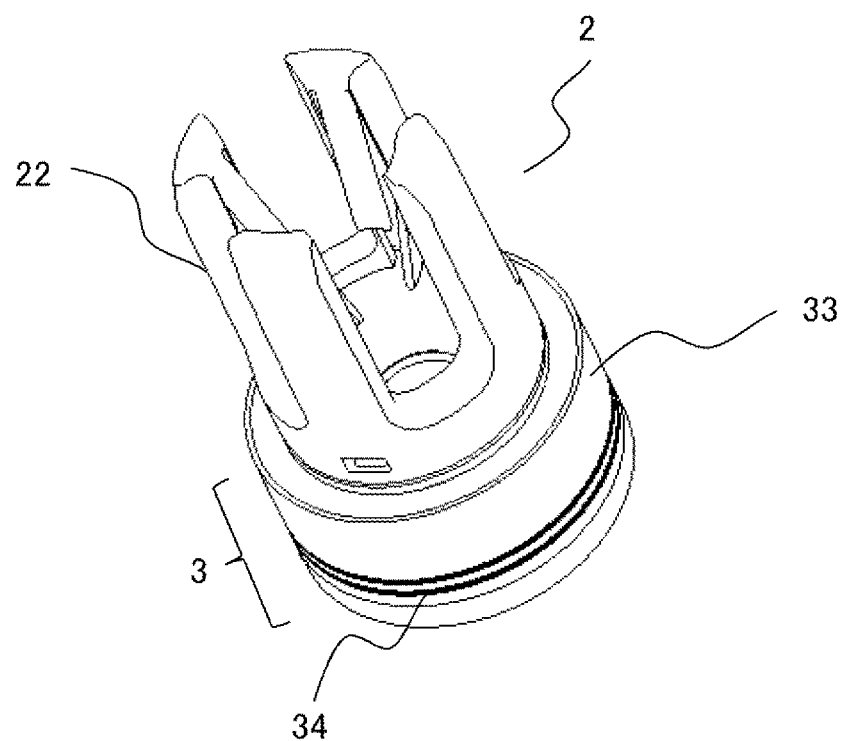

[FIG. 10]

| IDENTIFICATION COLOR | ATTRIBUTE (TYPE OF PROCESSING) |
|---|---|
| BLACK | CALIBRATION SAMPLE |
| WHITE | ACCURACY MANAGEMENT SAMPLE |
| RED | EMERGENCY PROCESSING SAMPLE |
| PEACH | RE-INSPECTION SAMPLE |
| GREEN | CLEANING SAMPLE |

| LINE TYPE OF IDENTIFICATION COLOR | ANALYSIS ITEM |
|---|---|
| SOLID LINE | CALIBRATION SAMPLE GROUP 1 |
| DOTTED LINE | CALIBRATION SAMPLE GROUP 2 |
| DASHED LINE | CALIBRATION SAMPLE GROUP 3 |
| DOTDASH LINE | CALIBRATION SAMPLE GROUP 4 |
| WAVY LINE | CALIBRATION SAMPLE GROUP 5 |

| NUMBER OF LINES OF IDENTIFICATION COLOR | TYPE OF INDIVIDUAL |
|---|---|
| 1 LINE | No. 1 OF CALIBRATION SAMPLE GROUP 1 |
| 2 LINES | No. 2 OF CALIBRATION SAMPLE GROUP 1 |
| 3 LINES | No. 3 OF CALIBRATION SAMPLE GROUP 1 |
| 4 LINES | No. 4 OF CALIBRATION SAMPLE GROUP 1 |
| 5 LINES | No. 5 OF CALIBRATION SAMPLE GROUP 1 |

AUTOMATIC ANALYSIS DEVICE

TECHNICAL FIELD

The present invention relates to an automatic analysis device.

BACKGROUND ART

In hospitals and inspection facilities, a sample such as blood or urine supplied from a patient or the like is analyzed by an automatic analysis device for clinical examination. Other examples of the sample to be processed by the automatic analysis device include a calibration sample for creating a calibration curve, an accuracy management sample, an emergency processing sample, a re-inspection sample, and a cleaning sample for maintenance.

As described above, since samples used for a plurality of purposes are present in the automatic analysis device, it is necessary to switch operations of the automatic analysis device depending on the attribute of sample. Therefore, when an operator switches an operation of the automatic analysis device, a method is considered in which the attribute of sample can be easily identified to prevent an erroneous operation. For example, PTL 1 discloses an automatic analysis device in which "a color marker for identifying the type of sample is attached to a sample vessel, a unit for identifying the color of the marker is provided in an automatic sample supply device, and a function of selecting any operation among normal analysis, sensitivity test, and calibration curve creation based on the identified color is imparted to a control device" (see the "Solution to Problem" section).

A method also exists in which a color label is attached to a sample vessel holder that holds a sample vessel instead of the sample vessel to identify the attribute of sample. In addition, as a method for identifying an individual sample, a method of attaching a barcode to a sample vessel or mounting an RFID to a sample vessel holder also exists.

CITATION LIST

Patent Literature

PTL 1: JP-A-H02-290558

SUMMARY OF INVENTION

Technical Problem

As in PTL 1 and the like, the type of processing performed on a sample can be identified by applying a color to a sample vessel or a sample vessel holder, but an individual sample cannot be identified. Further, individual identification is enabled by using a reading device in the method using a barcode or an RFID, but it is difficult for an operator to identify the barcode or the RFID.

An object of the invention is to provide an automatic analysis device in which even an operator can easily identify from the type of processing to the type of individual, and erroneous setting hardly occurs.

Solution to Problem

In order to solve the above problem, the invention includes a vessel holder for holding a sample vessel, a reading unit for reading an identification area formed in the vessel holder, and a control unit for performing processing based on information read by the reading unit, in which the control unit identifies the type of processing based on the type of color applied to the identification area and identifies the type of individual in the sample vessel based on how the identification area is colored.

Advantageous Effect

The invention provides an automatic analysis device in which even an operator can easily identify from the type of processing to the type of individual, and erroneous setting hardly occurs.

BRIEF DESCRIPTION OF DRAWINGS

FIG. 1 is a diagram schematically showing a main part of an automatic analysis device.

FIG. 2 is a diagram showing an outline of the entire configuration of an automatic analysis device according to Example 1.

FIG. 3 is a diagram showing an example of a display mode of an identification area of a sample vessel holder according to Example 1.

FIG. 4 is a table showing a definition example of an identification area according to Example 1.

FIG. 5 is a diagram showing an outline of the entire configuration of an automatic analysis device according to Example 2.

FIG. 6 is a diagram showing an example of a display mode of an identification area of a sample vessel holder according to Example 2.

FIG. 7 is a table showing a definition example of an identification area according to Example 2.

FIG. 8 is a diagram showing an example in which the type of individual is identified by a combination of the number of thin lines and the number of thick lines.

FIG. 9 is a diagram showing an example of a display mode of an identification area of a sample vessel holder according to Example 3.

FIG. 10 is a table showing a definition example of an identification area according to Example 3.

DESCRIPTION OF EMBODIMENTS

Examples of the invention will be described in detail with reference to the drawings.

Example 1

Hereinafter, Example 1 according to the invention will be described with reference to FIGS. 1 to 4. FIG. 1 schematically shows a main part of an automatic analysis device 1 according to the present example. FIG. 2 shows an outline of the entire configuration of the automatic analysis device 1 according to the present example.

The automatic analysis device 1 according to the present example includes a biochemical analysis module 101, a sample vessel input and storage module 102, a control unit 6, and an operation unit 115. The operation unit 115 includes a display unit such as a monitor and an input and output unit such as a keyboard, and is configured to be capable of operating the automatic analysis device 1.

A sample vessel holder 2 according to the present example holds only one sample vessel 4, and has a substantially circular cross section in a horizontal direction. The sample vessel holder 2 includes a sample vessel holding area 22 formed in an upper portion and an identification area 3 formed in a lower portion. Further, the identification area 3 includes a first colored portion 31 occupying a main range and a second colored portion 32 corresponding to a remaining range. The sample vessel holding area 22 and the identification area 3 are integrally formed.

FIG. 4 is a table showing a method of identifying the sample vessel holder 2 according to the present example.

First, the attribute of sample, that is, the type of processing can be identified according to the type of color of an identification color 1 (first color) applied to the first colored portion 31. For example, when the identification color 1 is "black", it is known that the attribute is "calibration sample", and the sample in the sample vessel 4 held by the sample vessel holder 2 is used for calibration processing to create a calibration curve.

Next, an analysis item can be identified according to the type of color of an identification color 2 (second color) applied to the second colored portion 32. For example, when the identification color 2 is "white", it is known that the analysis item is "group 1".

In the present example, it is possible to further identify the sample, that is, to identify the type of individual, according to how the color of the identification color 2 is applied. For example, as shown in FIG. 3, when the number of lines of the identification color 2 is "1", it is known that the type of individual is "No. 1", and when the number of lines of the identification color 2 is "2", it is known that the type of individual is "No. 2".

Here, when the identification color 1 and the identification color 2 are the same color, it is impossible to identify how the identification color 2 is applied, and thus the identification color 1 and the identification color 2 are required to be different colors. Further, since lines are applied on the sample vessel holder 2 in a circumferential direction in the present example, the lines can be identified regardless of which position on an outer circumferential surface of the sample vessel holder 2 is stopped to face an operator or a reading unit 5.

According to the present example, identification information of the sample can be displayed by effectively using the outer circumferential surface on the lower portion of the sample vessel holder 2. Even in the identification area 3 having a limited height dimension, identification information of multiple layers can be displayed with a small number of colors by effectively coloring the identification area 3. Therefore, not only the reading unit 5 but also the operator can identify a large amount of information on the type of processing and the type of individual.

Hereinafter, processing using the automatic analysis device 1 according to the present example will be described. In the present example, a case where a calibration curve for sample concentration calculation is created using a calibration sample will be described as an example. Here, a case where one type (No. 1) of calibration sample is required for an analysis item (group 1) to be calibrated will be described. When the calibration curve is created, a plurality of calibration samples are often required for target analysis items, and when three calibration samples are required, groups of No. 1, No. 2, and No. 3 of target analysis items are to be used.

First, a calibration sample set with a known concentration is dispensed into the sample vessel 4. Thereafter, the operator respectively inputs, through the operation unit 115, that the identification color 1 for indicating the attribute is "black", that the identification color 2 for indicating the analysis item is "white", that the number of lines of the identification color 2 for indicating the type of individual is one, and the known concentration of the target calibration sample.

Thereafter, the target calibration sample is placed by the operator on the sample vessel holder 2 corresponding to the information input from the operation unit 115, that is, the sample vessel holder 2 including the identification area 3 in which the color of the first colored portion 31 is "black", the color of lines as the second colored portion 32 is "white", and the number of lines is "one".

The calibration sample placed on the sample vessel holder 2 is installed in a sample vessel holder input unit 111 provided in the sample vessel input and storage module 102 of the automatic analysis device 1. Then, the identification information attached to the identification area 3 of the sample vessel holder 2 is read by the reading unit 5 provided in the sample vessel input and storage module 102 during transport. The reading unit 5 uses, for example, a linear image sensor capable of one-dimensionally reading color information, but the reading unit 5 is not limited to this example. The acquired identification information is sent to the control unit 6.

The control unit 6 recognizes that the identification color 1 is "black", the identification color 2 is "white", and the number of lines of the identification color 2 is "one". Then, based on the recognition that the identification color 1 is "black", the control unit 6 selects processing of calibration curve creation after analysis as the type of processing. In addition, based on the recognition that the identification color 2 is "white" and the number of lines of the identification color 2 is "one", the control unit 6 sets "group 1" as the analysis item and "No. 1" as the type of individual respectively for the calibration sample held by the sample vessel holder 2, and executes the processing related to the calibration curve creation.

After the identification information is read by the reading unit 5, the sample vessel holder 2 is sent to a sample vessel transport unit 113 of the biochemical analysis module 101 via a sample vessel transport unit 113 of the sample vessel input and storage module 102, and is further transported to a dispensing sample vessel transport unit 114 in the biochemical analysis module 101. The calibration sample transported to the dispensing sample vessel transport unit 114 is aspirated from the sample vessel 4 by a sample dispensing mechanism 103 in the biochemical analysis module 101. Thereafter, a sample dispensing probe of the sample dispensing mechanism 103 is moved onto a reaction vessel placed on a reaction vessel holding and rotating mechanism 106 in the biochemical analysis module 101, and the calibration sample is discharged into the reaction vessel. After the sample is discharged, a first reagent dispensing mechanism 109 and a second reagent dispensing mechanism 110 in the biochemical analysis module 101 are moved into a reagent probe cleaning tank, and an inner wall and an outer wall of a reagent probe are cleaned with deionized water.

On the other hand, a reagent vessel holding and rotating mechanism 107 in the biochemical analysis module 101 also rotates to a predetermined position so that the reagent corresponding to the target calibration sample can be aspirated in accordance with the analysis item recognized by the control unit 6. After the sample dispensing mechanism 103 discharges the sample to the reaction vessel, a first reagent probe of the first reagent dispensing mechanism 109 performs a dispensing operation on a first reagent. When a tip end of the first reagent probe enters a reagent bottle after the first reagent probe is moved to a position of a reagent cassette installed in the reagent vessel holding and rotating mechanism 107, the first reagent probe stops a downward movement and aspirates a set amount of reagent. Next, the first reagent probe is moved to a position of the reaction vessel and discharges the set amount of reagent. Thereafter, the first reagent probe is moved to a cleaning position of the first reagent probe, and an inner wall and an outer wall of the first reagent probe are cleaned.

After the dispensation of the first reagent, the reaction vessel installed in the reaction vessel holding and rotating mechanism 106 is rotationally moved to an agitation position, and the calibration sample and the reagent are mixed with each other by an agitation mechanism 108 in the biochemical analysis module 101. After the agitation, photometry of a reaction solution is started by a photometer 105. The photometry is performed when the reaction vessel crosses an optical path during rotation of the reaction vessel holding and rotating mechanism 106. Similarly, when a second reagent is required, the photometry is performed after agitation is performed by the agitation mechanism 108 when the second reagent is dispensed at a predetermined timing by the second reagent dispensing mechanism 110.

When the photometry is completed, the calibration curve is created using absorbance of a designated photometric point and the known concentration input in advance by the operation unit 115. The reaction solution after the measurement is aspirated by a nozzle of a reaction vessel cleaning mechanism 104 in the biochemical analysis module 101 and discharged to a waste liquid tank in the automatic analysis device 1. Next, a cleaning liquid is injected into an empty reaction vessel, and the process proceeds to a next cleaning step. After completion of cleaning, a water blank is measured, and the reaction vessel is used for next analysis.

Example 2

Hereinafter, Example 2 according to the invention will be described with reference to FIGS. 5 to 8. FIG. 5 shows an outline of the entire configuration of an automatic analysis device according to the present example.

As shown in FIG. 5, the automatic analysis device 1 according to the present example includes a sample pre-treatment and post-treatment system 250, an immune analysis module 201, the control unit 6, and the operation unit 115. The immune analysis module 201 is connected to the sample pre-treatment and post-treatment system 250 via a sample vessel transport connection unit 256. The operation unit 115 includes a display unit such as a monitor and an input and output unit such as a keyboard, and is configured to be capable of operating the immune analysis module 201 and the sample pre-treatment and post-treatment system 250.

As shown in FIG. 6, in the sample vessel holder 2 of the present example, the identification area 3 is a separate component, and only the identification area 3 can be replaced.

FIG. 7 shows a method of identifying the sample vessel holder 2 according to the present example. A calibration sample as a target in the present example will be described by taking a case where an analysis item is "group 5" and six types of individuals are "No. 1" to "No. 6" as examples.

In an identification area 3 of the sample vessel holder 2 corresponding to "No. 1" of "group 5" of "calibration sample", the identification color 1 is "black", the identification color 2 is "light blue", and lines of the identification color 2 are "one thin line and zero thick line". Similarly, in an identification area 3 corresponding to "No. 5" of "group 5" of "calibration sample", the identification color 1 is "black", the identification color 2 is "light blue", and lines of the identification color 2 are "five thin lines and zero thick line". In an identification area 3 corresponding to "No. 6" of "group 5" of "calibration sample", the identification color 1 is "black", the identification color 2 is "light blue", and lines of the identification color 2 are "one thin line and one thick line". FIG. 8 shows a method for identifying No. 1 to No. 10 by a combination of the number of thin lines and the number of thick lines.

Hereinafter, processing using the automatic analysis device 1 according to the present example will be described. In the present example, a case where a calibration curve for sample concentration calculation is created using six types of calibration samples for a certain analysis item will be described as an example.

First, six types of calibration samples having set known concentrations are supplied to an operator of the automatic analysis device 1 in a state of being dispensed into the sample vessel 4. Thereafter, for the "calibration sample" in which, for example, the analysis item is "group 5" and the type of individual is "No. 1", the operator respectively inputs, through the operation unit 115, that the identification color 1 is "black", the identification color 2 is "light blue", the number of lines of the identification color 2 is "one thin line and zero thick line", and the known concentration. Similarly, the operator inputs identification information and the known concentrations by the operation unit 115 for the calibration samples "No. 2" to "No. 6".

Thereafter, the operator places the target calibration samples in the sample vessel holder 2 including an identification area corresponding to the identification information input from the operation unit 115. For example, the "calibration sample" in which the type of individual is "No. 1" in "group 5" is placed on the sample vessel holder 2 in which the identification color 1 is "black", the identification color 2 is "light blue", and the number of lines of the identification color 2 is "one thin line and zero thick line".

The calibration sample placed on the sample vessel holder 2 is installed in a sample vessel holder input unit 255 provided in a sample vessel input and storage module 251 in the sample pre-treatment and post-treatment system 250 of the automatic analysis device 1. Then, the identification information attached to the identification area 3 of the sample vessel holder 2 is read by the reading unit 5 provided in the sample vessel input and storage module 251 during transport. The acquired identification information is sent to the control unit 6.

The control unit 6 recognizes that the identification color 1 is "black", the identification color 2 is "light blue", and the number of lines of the identification color 2 is "one thin line and zero thick line". Then, based on the recognition that the identification color 1 is "black", the control unit selects processing of calibration curve creation after analysis as the type of processing. Further, based on the recognition that the identification color 2 is "light blue" and the number of lines of the identification color 2 is "one thin line and zero thick line", the control unit 6 sets "group 5" as the analysis item and "No. 1" as the type of individual respectively for the calibration sample held by the sample vessel holder 2, and executes the processing related to the calibration curve creation.

After the identification information is read by the reading unit 5, the sample vessel holder 2 is temporarily transported to a sample vessel cold storage module 252 in the sample pre-treatment and post-treatment system 250 via the sample vessel transport unit 113 of the sample vessel input and storage module 251 in the sample pre-treatment and post-treatment system 250, and is cooled and stored. Then, the sample vessel holder 2 is transported from the sample vessel cold storage module 252 to a sample vessel opening and closing module 253 in the sample pre-treatment and post-treatment system 250 via the sample vessel transport unit 113 at a predetermined calibration timing or a calibration timing required by a request of the operator from the operation unit 115. The sample vessel opening and closing module 253 performs opening of the sample vessel 4. Thereafter, the sample vessel holder 2 is sent to the sample vessel transport unit 113 of the immune analysis module 201 via the sample vessel transport unit 113 and the sample vessel transport connection unit 256 in the sample pre-treatment and post-treatment system 250. Further, the sample vessel holder 2 is transported from the sample vessel transport unit 113 to the dispensing sample vessel transport unit 114 in the immune analysis module 201.

When the target calibration sample is analyzed, first, a reaction vessel transfer mechanism 210 in the immune analysis module 201 transports a reaction vessel to a reaction vessel holding and rotating mechanism 202 in the immune analysis module 201.

Next, the reaction vessel holding and rotating mechanism 202 rotates to a reagent dispensing position. A reagent dispensing mechanism 204 in the immune analysis module 201 moves to a reagent aspirating position, and aspirates a first reagent from a reagent vessel placed on a reagent vessel holding and rotating mechanism 205 in the immune analysis module 201. After the first reagent is aspirated, a tip end of a reagent probe of the reagent dispensing mechanism 204 is cleaned.

After a disposable chip is mounted on a sample dispensing mechanism 203 in the immune analysis module 201, the sample dispensing mechanism 203 moves to a sample aspirating position set in the dispensing sample vessel transport unit 114 in the immune analysis module 201 and aspirates the sample. After the sample is aspirated, the sample dispensing mechanism 203 moves to a dispensing position and discharges the sample into the reaction vessel into which the reagent has already been dispensed. After the sample is discharged, the sample dispensing mechanism 203 moves to a chip discarding position and discards the disposable chip.

After a predetermined time required for the reaction elapses, a second reagent is discharged into the reaction vessel by the same operation. Thereafter, a transport mechanism (not shown) transports the reaction vessel to an agitation mechanism 211 in the immune analysis module 201, and the sample and the reagent in the reaction vessel are agitated by the agitation mechanism 211. Thereafter, the transport mechanism transports and returns the reaction vessel to an original position of the reaction vessel holding and rotating mechanism 202 in the immune analysis module 201.

Further, after the time required for the reaction elapses, a shipping nozzle of a first shipping mechanism 206 or a second shipping mechanism 207 performs aspiration in an order of a buffer solution, a reaction solution, and a buffer solution. The buffer solution and the reaction solution are sent together to a flow cell in a first light detection unit 208 or a second light detection unit 209 through a tube, and a reaction product bonded to magnetic particles is captured on electrodes by a magnet. After the capture of the reaction product, a voltage is applied to cause a luminescence reaction of the reaction product, a light emitting amount is measured by a photomultiplier in the first light detection unit 208 or the second light detection unit 209, and a calibration curve is created based on the light emitting amount using a known concentration input in advance from the operation unit 115. The sample vessel holder 2 after the measurement is transported from the sample vessel transport unit 113 to the sample vessel opening and closing module 253. The sample vessel opening and closing module 253 closes the sample vessel 4. The sample vessel holder 2 for holding the closed sample vessel 4 is transported to the sample vessel cold storage module 252, and is cooled and stored until the sample vessel holder 2 is subjected to the next calibration.

Example 3

Example 3 of the invention will be described below with reference to FIGS. 9 and 10.

FIG. 9 is a perspective view showing a structure of the sample vessel holder 2 according to the present example. In the present example, the identification area 3 of the sample vessel holder 2 includes a base portion 33 which is not colored, and a colored portion 34 which is colored. That is, the present example is different from Examples 1 and 2 in that one colored portion is provided, and even when the identification color is one color (i.e., a single color), not only the type of processing but also the type of individual can be identified.

However, it does not mean that the base portion 33 does not have a color. Actually, the base portion 33 has a color of a material forming the sample vessel holder 2. Therefore, it is necessary to allow the operator to visually distinguish the colored portion 34, which is a remaining portion of the identification area 3 with respect to the base portion 33, by using a color different from the color of the material of the sample vessel holder 2.

FIG. 10 shows a method of identifying the sample vessel holder 2 according to the present example.

First, the attribute of sample, that is, the type of processing can be identified according to the type of color of the colored portion 34. For example, when the color of the colored portion 34 is "black", it is known that the attribute is "calibration sample".

Next, the present example can identify an analysis item according to the type of line of the colored portion 34. For example, when the type of line of the colored portion 34 is "solid line", it is known that the analysis item is "group 1".

In the present example, the type of individual can be identified according to the number of lines of the colored portion 34. For example, when the number of lines of the colored portion 34 is "one", it is known that the type of individual is "No. 1".

According to the present example, only one color is required for coloring the identification area 3, and thus an advantage is obtained that the sample vessel holder 2 can be provided at low cost. In addition, the present example describes a method of changing the type of line as a way to apply a color, but the method may also change the type of pattern or symbol.

The invention is not limited to the above examples, and includes various modifications. For example, in Example 1, the identification area 3 includes the first colored portion occupying a main range and the second colored portion corresponding to a remaining range, but locations of colored portions are not limited to this example. That is, the identification area 3 may be divided into an upper area and a lower area, a part of the upper area with respect to a base may be applied with the identification color 1, and a part of the lower area with respect to the base may be applied with the identification color 2.

In addition, Examples 1 to 3 have been described in detail for easy understanding of the invention, and the invention is not necessarily limited to those including all the configurations described above. In addition, a part of a configuration of a certain example may be replaced with a configuration of another example, and a configuration of a certain example may also be added with a configuration of another example. A part of a configuration of each example may be added, deleted, or replaced with another configuration.

REFERENCE SIGN LIST

1: automatic analysis device
2: sample vessel holder
22: sample vessel holding area
3: identification area
31: first colored portion
32: second colored portion
4: sample vessel
5: reading unit
6: control unit
101: biochemical analysis module
102: sample vessel input and storage module
103: sample dispensing mechanism
104: reaction vessel cleaning mechanism
105: photometer
106: reaction vessel holding and rotating mechanism
107: reagent vessel holding and rotating mechanism
108: agitation mechanism
109: first reagent dispensing mechanism
110: second reagent dispensing mechanism
111: sample vessel holder input unit
112: sample vessel holder storage unit
113: sample vessel transport unit
114: dispensing sample vessel transport unit
115: operation unit
201: immune analysis module
202: reaction vessel holding and rotating mechanism
203: sample dispensing mechanism
204: reagent dispensing mechanism
205: reagent vessel holding and rotating mechanism
206: first shipping mechanism
207: second shipping mechanism
208: first light detection unit
209: second light detection unit
210: reaction vessel transfer mechanism
211: agitation mechanism
250: sample pre-treatment and post-treatment system
251: sample vessel input and storage module
252: sample vessel cold storage module
253: sample vessel opening and closing module
254: sample vessel holder storage unit
255: sample vessel holder input unit
256: sample vessel transport connection unit

The invention claimed is:

1. An automatic analysis device, comprising: a vessel holder for holding a sample vessel; a reading unit for reading an identification area formed in the vessel holder; and a control unit for performing processing based on information read by the reading unit, wherein the vessel holder has a circular horizontal cross section and holds only one sample vessel, and includes a vessel holding area formed in an upper portion and the identification area formed in a lower portion, and the vessel holding area and the identification area are integrally formed, a first color applied to a base portion and a second color applied to between one and five lines extending in a circumferential direction of a remaining portion are present in the identification area, the first color and the second color are different colors, and the control unit identifies the type of processing based on the type of the first color, identifies an analysis item based on the type of the second color, and identifies the type of individual in the sample vessel based on the number of lines of the second color.

2. The automatic analysis device according to claim 1, wherein
the identification area is detachable from the vessel holder.

* * * * *